United States Patent
Li et al.

(10) Patent No.: US 8,112,602 B2
(45) Date of Patent: Feb. 7, 2012

(54) STORAGE CONTROLLER FOR HANDLING DATA STREAM AND METHOD THEREOF

(75) Inventors: Yi-Chun Li, Taipei County (TW); Teh-Chern Chou, Taipei Hsien (TW)

(73) Assignee: Infortrend Technology, Inc., Zhonghe Dist., New Taipei (TW)

( * ) Notice: Subject to any disclaimer, the term of this patent is extended or adjusted under 35 U.S.C. 154(b) by 599 days.

(21) Appl. No.: 12/335,544

(22) Filed: Dec. 16, 2008

(65) Prior Publication Data

US 2009/0157973 A1    Jun. 18, 2009

Related U.S. Application Data

(60) Provisional application No. 61/014,067, filed on Dec. 16, 2007.

(51) Int. Cl.
*G06F 12/00* (2006.01)

(52) U.S. Cl. .................................................... 711/163
(58) Field of Classification Search .................. None
See application file for complete search history.

(56) References Cited

U.S. PATENT DOCUMENTS

| | | | |
|---|---|---|---|
| 7,340,672 B2* | 3/2008 | Goldschmidt et al. | 714/801 |
| 7,986,439 B2* | 7/2011 | Walmsley | 358/1.9 |
| 2004/0093505 A1* | 5/2004 | Hatakeyama et al. | 713/189 |
| 2006/0179345 A1* | 8/2006 | Subbarao | 714/6 |

* cited by examiner

Primary Examiner — Hiep Nguyen
(74) Attorney, Agent, or Firm — Winston Hsu; Scott Margo

(57) ABSTRACT

A storage controller for handling data stream having data integrity field (DIF) and method thereof. The storage controller comprises a host-side I/O controller for receiving a data stream from a host entity, a host-side I/O controller for connecting to a physical storage device, and, a central processing circuitry having at least one DIF I/O interface for handling DIF data so as to reduce the number of memory access to the main memory of the storage controller.

42 Claims, 13 Drawing Sheets

| Transmission of 4k-byte payload data | Max request data size to memory | | | | |
|---|---|---|---|---|---|
| | 256 bytes | 512 bytes | 1024 bytes | 2048 bytes |
| Without DIF protection | 16 | 8 | 4 | 2 |
| Utilizing DIF protection but without the cache and the function of merging the payload data blocks | 26 | 18 | 18 | 18 |
| Utilizing DIF protection and the cache but without the function of merging the payload data blocks | 19 | 11 | 11 | 11 |
| Utilizing DIF protection, the cache, and the function of merging the payload data blocks | 17 | 9 | 5 | 3 |
| Memory access times | | | | |

STORAGE CONTROLLER FOR HANDLING DATA STREAM AND METHOD THEREOF

CROSS REFERENCE TO RELATED APPLICATIONS

This application claims the benefit of U.S. Provisional Application No. 61/014,067, which was filed on Dec. 16, 2007.

Background of the Invention

1. Field of the Invention

The present invention relates to data stream processing, especially to a storage controller used for processing a data stream having Data Integrity Field (DIF) data and a method thereof.

2. Description of the Prior Art

When using a storage system such as a RAID, it is important to ensure reliability of stored data. Therefore, error detection technology is very critical and important and the object thereof is to ensure data integrity in a data transmission path.

Data are often transmitted in a format call data stream, and the data stream typically includes one or more data blocks of a specific size, wherein data contained in the data block are called payload data, and the specific size can be 512 bytes or other number of bytes meeting a certain transmission protocol.

Data integrity field (DIF) is a data protection field having 8 bytes generated according to content and/or address of a 512-byte payload data block for protecting the payload data block, and can be appended after each payload data block in the data stream for ensuring data integrity of the payload data block each in the data stream in the data transmission path.

However, because the DIF data are data appended after the original data blocks, and the data formats of the DIF data and the original data are different, the performance of a storage system is decreased drastically when payload data with DIF data is transmitted therein. The key point of present invention is to provide a method for decreasing impact caused by DIF technology on the system performance while using DIF technology for improving the data integrity.

SUMMARY OF THE INVENTION

DIF technology is utilized for protecting data integrity of data blocks, therefore the DIF technology is increasingly employed in storage equipments. One object of the present invention is to provide a storage controller for processing a data stream having DIF data and a method thereof in expectation of still maintaining overall system performance in the storage system when the DIF technology is applied for ensuring the data integrity of data blocks in a data transmission process.

The present invention discloses a storage controller for processing a data stream, the storage controller comprising: a host-side IO controller for receiving a data stream from a host; a device-side IO controller for connecting to a physical storage device (PSD); a central processing circuitry for connecting the host-side IO controller and the device-side IO controller, the central processing circuitry having at least one data integrity field (DIF) IO interface for processing DIF data corresponding to payload data blocks in the received data stream; and a main memory connected to the central processing circuitry for storing data processed by the central processing circuitry, wherein the at least one DIF IO interface comprises a DIF cache for temporarily storing DIF data in order to reduce access times to the main memory.

The present invention also discloses a DIF IO interface for processing a data stream having DIF data, the DIF IO interface comprising: a bus interface for receiving a data stream containing a plurality of payload data blocks, wherein each of the payload data blocks has a corresponding DIF data in the data stream; a DIF cache connected to the bus interface for storing the DIF data in the data stream temporarily; and a PM FIFO buffer connected to the bus interface for storing the payload data blocks in the data stream, wherein the bus interface is capable of determining the payload data blocks and the DIF data in the data stream and storing the payload data blocks and the DIF data in the data stream into the PM FIFO buffer and the DIF cache respectively.

The present invention also discloses a method for processing a data stream in a storage controller, comprising the following steps: receiving a data stream containing a plurality of payload data blocks, wherein each of the payload data blocks has a corresponding DIF data in the data stream; retrieving and temporarily storing the DIF data in the data stream into a DIF cache in the storage controller; and writing the data temporarily stored in the DIF cache into a main memory of the storage controller in order to reduce access times to the main memory.

According to one embodiment of the present invention, the DIF IO interface of the storage controller is capable of verifying the payload data blocks and the corresponding DIF data in the received data stream to determine the data integrity of the payload data blocks.

According to one embodiment of the present invention, the DIF cache comprises a DIF write cache for storing DIF data to be written to the main memory, and a DIF read cache for storing DIF data read out from the main memory.

According to one embodiment of the present invention, the DIF cache comprises a DIF write cache for storing DIF data to be written to the main memory, or a DIF read cache for storing DIF data read out from the main memory.

According to one embodiment of the present invention, the DIF IO interface further comprises a primary memory First-in First-out buffer (PM FIFO buffer) and a bus interface, and the bus interface is for receiving the data stream and for transferring the payload data blocks and the corresponding DIF data in the data stream into the PM FIFO buffer and the DIF cache respectively.

According to one embodiment of the present invention, while receiving the data stream, the bus interface first merges the payload data blocks having contiguous addresses, and then writes the merged payload data blocks into the main memory.

According to one embodiment of the present invention, while receiving the data stream, the bus interface first merges the payload data blocks having contiguous addresses, and then writes the merged payload data blocks to the PM FIFO buffer.

According to one embodiment of the present invention, while the bus interface receives the data stream, DIF data corresponding to a plurality of the payload data blocks having contiguous addresses are stored in the DIF cache and then transferred into the main memory by one memory write request.

According to one embodiment of the present invention, when the DIF data to be stored in the DIF write cache and a previous DIF data stored in the DIF write cache do not have contiguous addresses, all data stored in the DIF write cache are stored into the main memory before the DIF data to be stored in the DIF write cache are stored into the DIF write cache.

According to one embodiment of the present invention, storing all the data stored in the DIF write cache into the main memory is activated through a software command.

According to one embodiment of the present invention, when the DIF write cache is full, all the data in the DIF write cache are stored into the main memory.

According to one embodiment of the present invention, if the DIF data to be read out is not stored in the DIF read cache, a plurality of the DIF data having contiguous addresses from the address of the DIF data to be read out in the main memory are read into the DIF read cache by one memory read request.

According to one embodiment of the present invention, the DIF IO interface comprises a DIF read data command buffer for storing read commands of the DIF data to be read out, the DIF read data command buffer contains a first read command and a second read command therein, the second read command is sent to the DIF read data command buffer later than the first read command and is executed later than the first read command, and before the second read command is executed, a potentially occurred cache miss can be determined and a read command is then issued to the main memory for reading the DIF data to be read out into the DIF read cache in advance.

According to one embodiment of the present invention, the bus interface is a peripheral component interconnect interface (PCI), a peripheral component interconnect extended interface (PCI-X), or a peripheral component interconnect express interface (PCI-E).

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 9 is a table of times of memory write requests need to be issued under different conditions.

DETAILED DESCRIPTION

Figure 1:
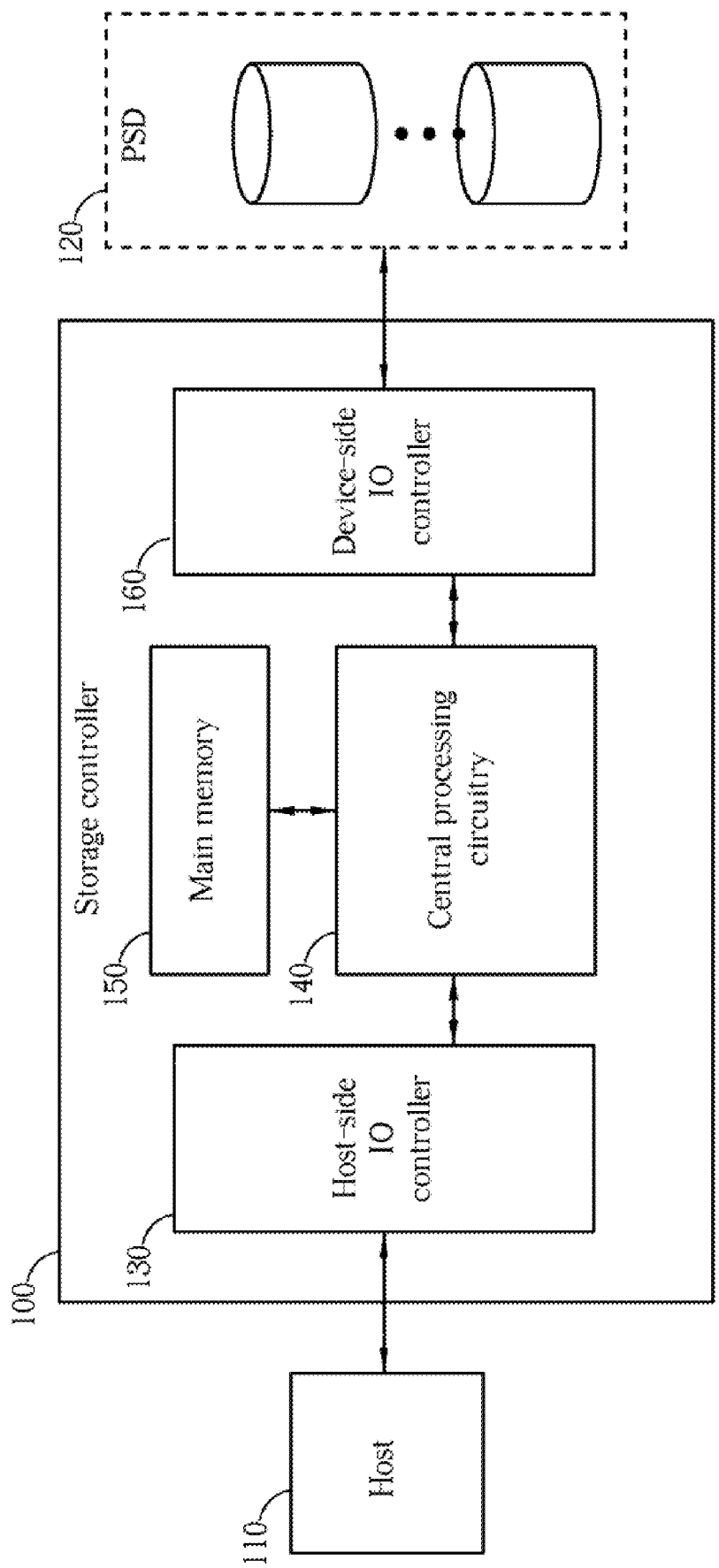
FIG. 1 is a block diagram of an embodiment of a storage system according to the present invention.

FIG. 1 illustrates a block diagram of a storage system, in which a storage controller 100 is utilized for connecting a host 110 and a physical storage device (PSD) 120. When the host 110 writes data to the storage system, the storage controller 100 receives a data stream from the host 110 through a host-side IO controller 130. The received data stream includes one or more payload data blocks and a data integrity field (DIF) data corresponding to each of the payload data blocks. The data stream is stored temporarily into a main memory 150 after being processed by central processing circuitry 140, and then the data stream is finally transmitted to a PSD 120 through a device-side IO controller 160 after being processed by the central processing circuitry 140. When the host 110 reads out data from the storage system, the storage controller 100 receives the data stream from the PSD 120 through the device-side IO controller 160. The received data stream includes one or more payload data blocks and a data integrity field (DIF) data corresponding to each of the payload data blocks. The data stream is stored temporarily in the main memory 150 after being processed by the central processing circuitry 140, and is then transmitted to the host 110 through the host-side IO controller 130 after being processed by the central processing circuitry 140.

Figure 2:
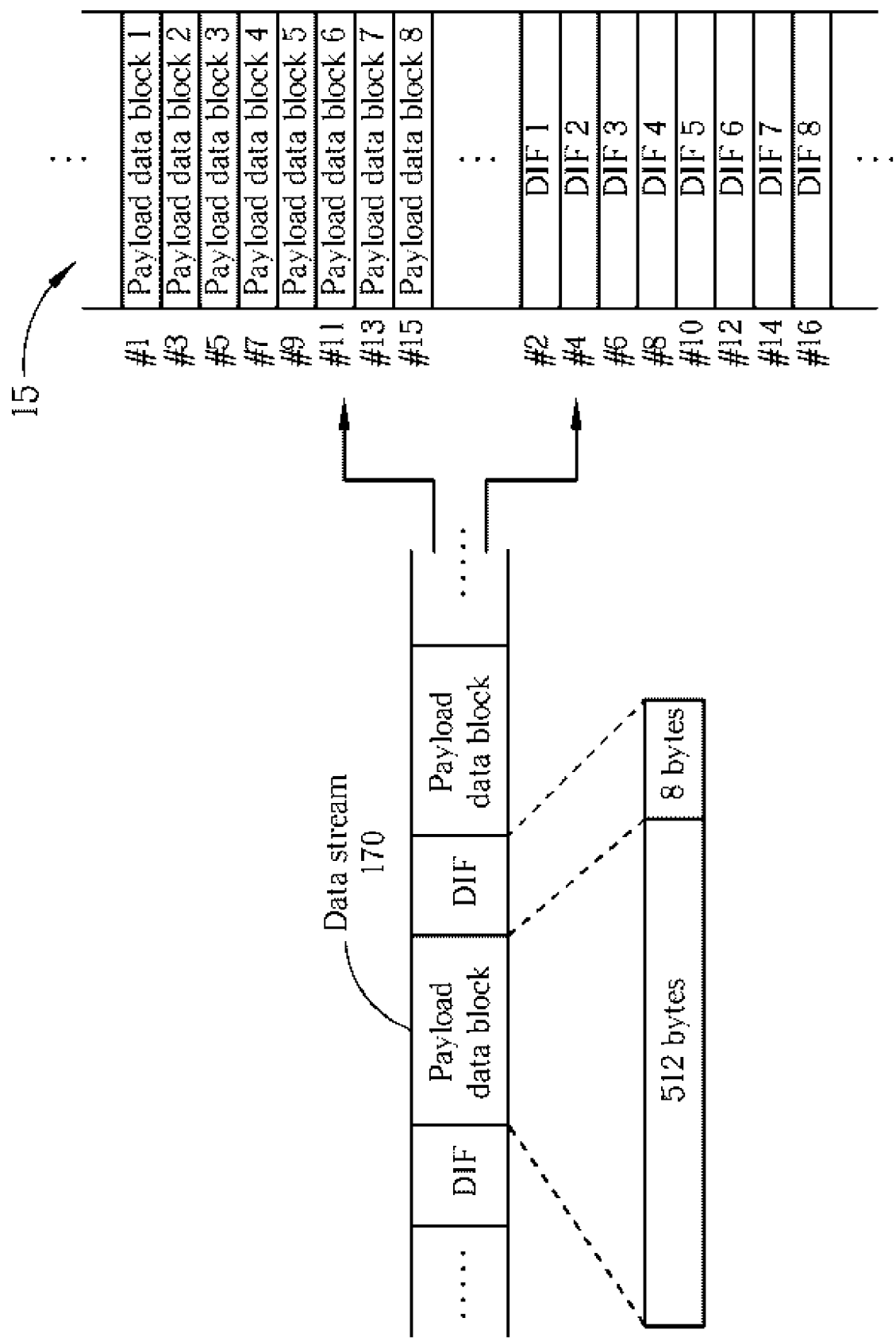
FIG. 2 illustrates a structure of a data stream processed by the storage system shown in FIG. 1 according to the present invention.

FIG. 2 illustrates a structure of a data stream 170 including a plurality of 512-byte payload data blocks and a plurality of corresponding DIF data. Each 512-byte payload data block corresponds to a DIF data in the data stream 170. The DIF data is an 8-byte data protection field data generated according to the contents and/or the address of the corresponding payload data block and is inserted after each corresponding payload data block for ensuring the data integrity of the payload data block in a data transmission path. Generally speaking, the DIF data includes a 2-byte logical block guard field used for a cyclic redundancy check (CRC), a 2-byte logical block application tag field, and a 4-byte logical block reference tag field.

The data stream 170 becomes a data stream 170 comprising DIF data after the DIF data is appended to the corresponding payload data blocks. As mentioned above, after the data stream 170 comprising the DIF data is sent to the storage controller 100, the storage controller 100 uses the DIF data to verify the data integrity of the corresponding payload data blocks.

However, to write a payload data block and the corresponding DIF data in the data steam 170 into the main memory 150, memory write requests must be issued for each respectively, as shown in FIG. 2.

In other words, if there are 8 payload data blocks and 8 DIF data corresponding to the 8 payload data blocks intended to be written to the main memory 150, the storage controller has to issue 16 memory write requests totally (memory write request #1 to memory write request #16), so as to accomplish the writing of the 8 payload data blocks and the 8 corresponding DIF data to the main memory 150, as shown in FIG. 2.

Applying the DIF technology can ensure the data integrity of the payload data block in a data transmission path. However, as mentioned above, the number of memory write requests issued to the main memory is twice as many as before, so as to accomplish the writing of the payload data blocks and the corresponding DIF data into the main memory, resulting in a degradation of the overall performance of the storage system.

Figure 3:
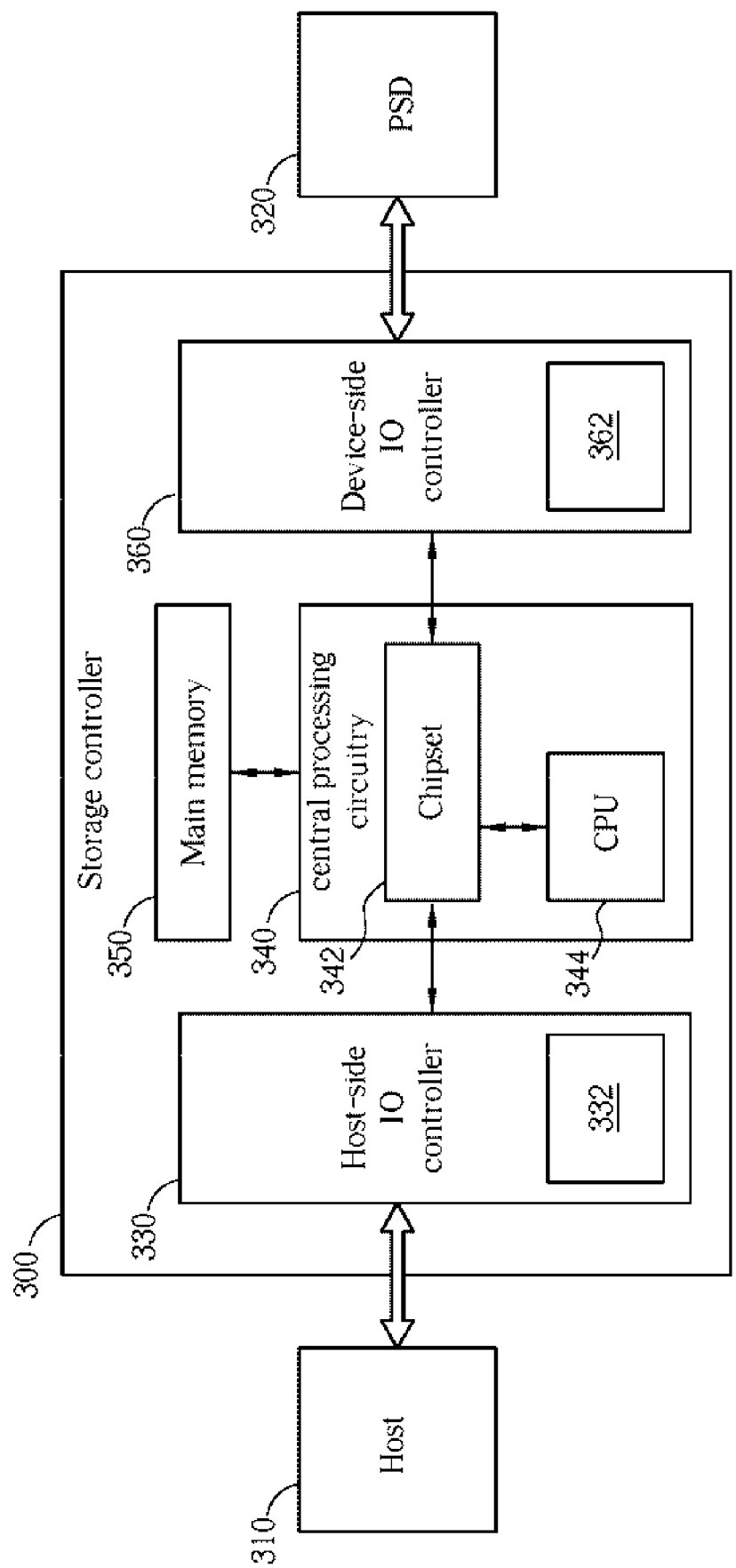
FIG. 3 is a block diagram of an embodiment according to the present invention.

FIG. 3 illustrates a block diagram of an embodiment according to the present invention. A storage controller 300 includes, but is not limited to, a host-side IO controller 330, a device-side IO controller 360, a main memory 350, and a central processing circuitry 340. In addition, the central processing circuitry includes, but is not limited to, a chipset 342 and a CPU 344. The CPU 344 can be, for example, a Power PC CPU. Although the functional blocks of the chipset 342 and the CPU 344 are described separately in the above, in a practical application, two or more functional blocks, or even all functional blocks may be integrated in one single chip.

Figure 4:
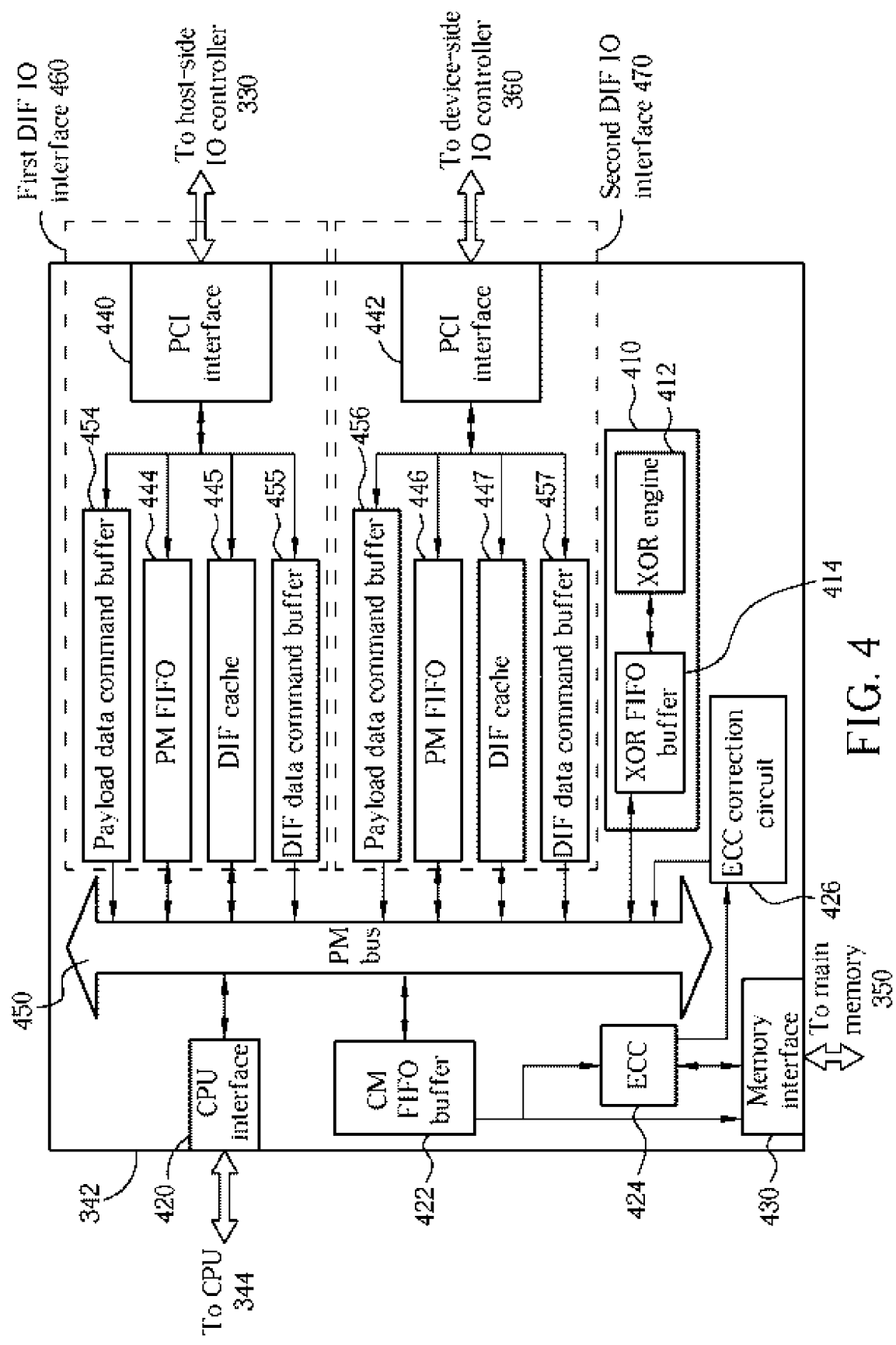
FIG. 4 is a block diagram of an embodiment of a chipset shown in FIG. 3 according to the present invention.

FIG. 4 is a block diagram of the chipset 342 of an embodiment according to the present invention. The chipset 342 may include, but is not limited to, a parity engine 410, a CPU interface 420, a memory interface 430, peripheral component interconnect (PCI) interfaces 440, 442, a primary memory bus (PM bus) 450, primary memory First-in-First-out buffers (PM FIFO buffers) 444, 446, DIF caches 445, 447, payload data command buffers 454, 456, and DIF data command buffers 455, 457.

The PM bus, as mentioned above, for example, may be a 64-bit or 128-bit, 133 MHz or 266 MHz bus connected to the parity engine 410, the CPU interface 420, the memory interface 430, and the PCI interfaces 440, 442, for communicating and transmitting data and control signals between the aforementioned devices. Although in the present embodiment, it is illustrated that the chipset 342 includes the parity engine 410, the parity engine 410, however, may also be either provided outside the chipset 342 or be omitted according to alternative embodiments of the present invention.

The data from the host-side IO controller 330 are first buffered in the PM FIFO buffer 444 and the DIF cache 445, and then are sent to the chipset 342. In a PCI slave cycle, the PCI interface 440 occupies the PM bus 450 so as to allow the data and control signals in the PM FIFO buffer 444 and the DIF cache 445 to be transmitted to the memory interface 430 or the CPU interface 420.

The data and control signals transmitted from the PM bus 450 to the CPU interface 420 may be transmitted to the CPU 344 for processing afterwards. Communication between the CPU interface 420 and the CPU 344 may be handled through, for example, 64-bit or 128-bit data transmission lines and 32-bit or 64-bit address lines. The data and control signals may be transmitted to the memory interface 430 through a CPU-to-memory FIFO buffer (CM FIFO buffer) 422 having a bandwidth of 64 bits or 128 bits and a bus speed 133 MHz or 266 MHz.

Between the CM FIFO buffer 422 and the memory interface 430, an error correction code circuit (ECC circuit) 424 is provided for generating an ECC code, for example, by performing an XOR operation on an 8-bit data to generate a 1-bit ECC code.

Next, the memory interface 430 stores the data and the ECC code into the main memory 350. The main memory 350 may be, for example, SDRAM. The data in the main memory 350 after being processed and comparison of the ECC codes in the ECC correction circuit 426 and the ECC circuit 424 are then transmitted to the PM bus 450 last. The ECC correction circuit 426 may be for performing 1-bit auto-correction and multi-bit error detection.

The parity engine 410, responding to the commands of the CPU 344, may perform a parity function of a specific RAID level. Of course, under some conditions, for example RAID 0, the parity engine 410 may stop and cease performing the parity function. In the embodiment shown in FIG. 4, the parity engine 410 may include, but is not limited to, an XOR engine 412 connected to the PM bus 450 through an XOR FIFO buffer 414. The XOR engine 412 may perform an XOR operation on data at a given memory location with a specified address and length.

In a practical application, the PCI interfaces 440 and 442 may be replaced by peripheral component interconnect extended interfaces (PCI-X), or PCI Express interfaces (PCI-E).

As shown in FIG. 4, the PCI interface 440, the PM FIFO buffer 444, the DIF cache 445, the payload data command buffer 454, and the DIF data command buffer 455 may form a host-side first DIF IO interface 460. And the PCI interface 442, the PM FIFO buffer 446, the DIF cache 447, the payload data command buffer 456, and the DIF data command buffer 457 may form a device-side second DIF IO interface 470.

The operations of the first DIF IO interface 460 are described later. It should be noted that, although here only operations of the first DIF IO interface 460 are described, operations of the second DIF IO interface 470 may be easily understood by persons of ordinary skills in the art according to the descriptions about the first DIF IO interface 460. The only difference between the first DIF IO interface 460 and the second DIF IO interface 470 is that the first DIF IO interface 460 is connected to the host for receiving/transmitting data from/to the host, and the second DIF IO interface 470 is connected to the device for receiving/transmitting data from/to the device.

Figure 5A:
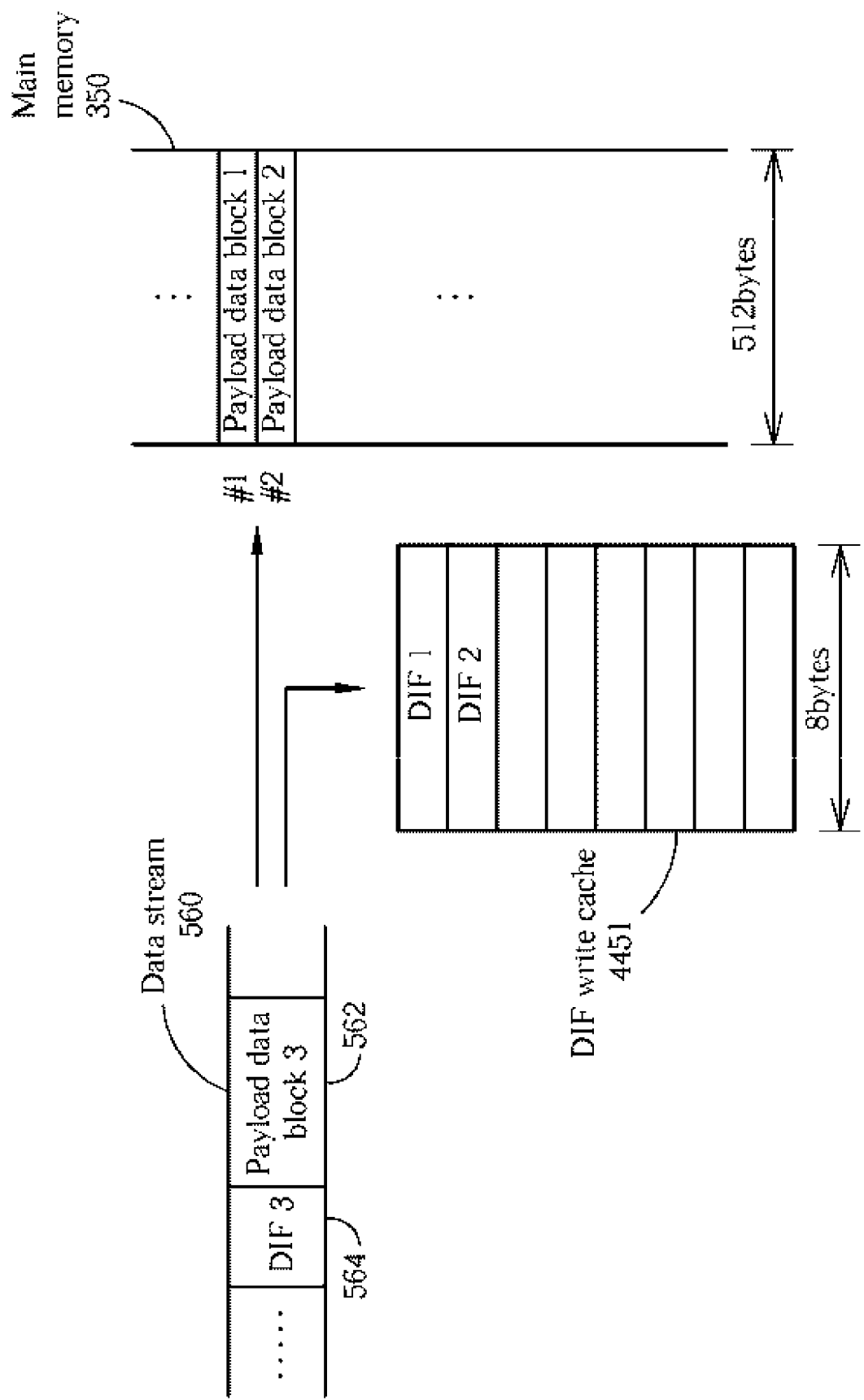
FIGS. 5A, 5B and 5C illustrate processing of a data stream according to an embodiment of the present invention.

The CPU chipset 342 receives a data stream 560 having DIF data from the host-side IO controller 330 through the PCI interface 440, as shown in FIG. 5A. When the PCI interface 440 in the CPU chipset 342 receives the data stream 560 having the DIF data, the PCI interface 440 determines the content of the data stream 560, and then stores the payload data blocks 562 in the data stream 560 into the PM FIFO buffer 444, and the corresponding DIF data 564 in the data stream 560 into the DIF cache 445, respectively.

The payload data blocks 562 stored in the PM FIFO buffer 444 and the corresponding DIF data 564 stored in the DIF cache 445 may be transmitted to the main memory 350 through the memory interface 430 later after a memory write request is issued to the main memory 350.

Figure 5B:
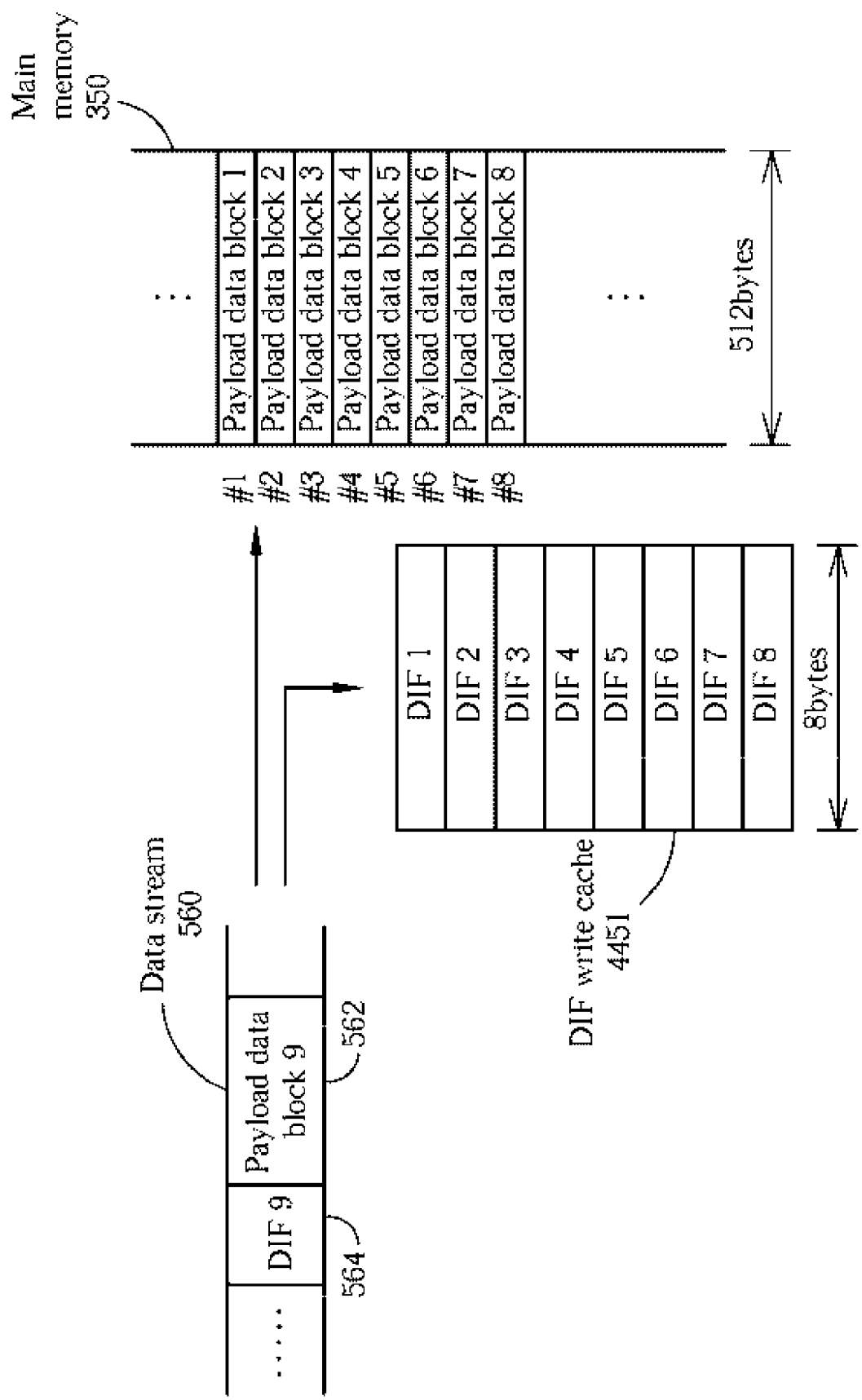
Figure 5C:
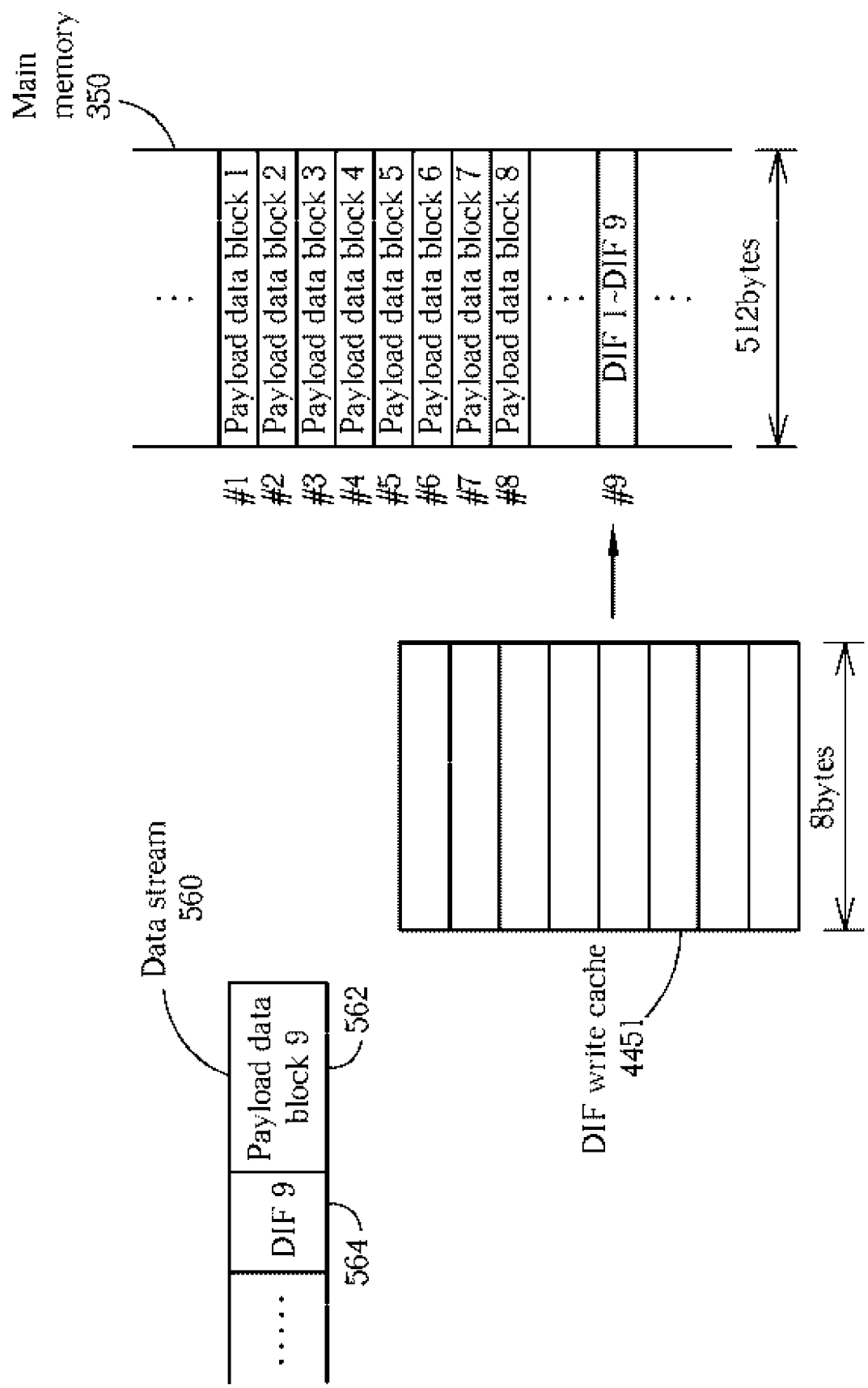

FIG. 5A to FIG. 5C illustrate the processing of the data stream 560 having DIF data according to a preferred embodiment of the present invention. The DIF cache 445 includes a DIF write cache 4451 (shown in FIGS. 5A, 5B, and 5C) and a DIF read cache 4452 (shown in FIGS. 7A and 7B) according to the preferred embodiment of the present invention.

In the present embodiment of the present invention, the capacity of the DIF write cache 4451 of the DIF cache 445 may be 512 bytes, and the maximum size of memory access to the main memory 350 may also be 512 bytes. It should be noted that the aforementioned capacity of the DIF write cache 4451 and the aforementioned the maximum size of memory access to the main memory 350 are examples for illustrative purposes only, and are not meant to be limitations of the present invention.

As shown in FIG. 5A, the data stream 560 is composed of payload data blocks 562 having contiguous addresses. Each payload data block 562 in the data stream 560 corresponds to a DIF data 564. When the payload data block 1 in the data stream 560 is received through the PCI interface 440, the payload data block 1 is written into the main memory 350 through the PM FIFO buffer 444 and the PM bus 450.

First, the first memory write request #1 is issued to the main memory 350 for storing the payload data block 1 into the main memory 350. Next, when the PCI interface 440 receives the DIF data 1 corresponding to the payload data block 1 in the data stream 560, the PCI interface 440 temporarily stores the DIF data 1 into the DIF write cache 4451 of the DIF cache 445 directly instead of the PM FIFO buffer 444.

Then, the same operations are repeated. The second memory write request #2 is issued to the main memory 350 for storing the payload data block 2 in the main memory 350. Because the payload data blocks in the data stream 560 are of contiguous addresses, the payload data block 1 and the payload data block 2 are stored in contiguous locations in the main memory 350, as shown in FIG. 5A.

When the PCI interface 440 wants to store the DIF data 2 corresponding to the payload data block 2 into the DIF cache 445, the PCI interface 440 first determines whether the payload data block 1 and the payload data block 2 have contiguous addresses so as to decide whether the DIF data 2 should be stored into the DIF write cache 4451 temporarily. Namely, if the payload data block 1 and the payload data block 2 have contiguous addresses, then the DIF data 2 is stored into the DIF write cache 4451 temporarily, as shown in FIG. 5A.

If the payload data block 1 and the payload data block 2 do not have contiguous addresses, the PCI interface 440 first issues a write request to the main memory 350 for storing all the DIF data originally stored in the DIF write cache 4451 into the main memory 350, and then stores the DIF data 2 into the DIF write cache 4451. According to the present embodiment, the DIF data 1 stored in the DIF write cache 4451 is stored into the main memory 350 first, and then the DIF data 2 is stored into the DIF write cache 4451. Thus, only the DIF data 2 is stored in the DIF write cache 4451 at this time.

The DIF data stored in the DIF write cache 4451 of the DIF cache 445 may be written to the main memory 350 because of the above-mentioned reason that the payload data blocks corresponding to the DIF data have discontinuous addresses. In addition, the DIF data stored in the DIF write cache 4451 may be written directly into the main memory 350 because of the DIF write cache 4451 being full or may be directly cleared out due to a software command.

According to the above-mentioned processes, as shown in FIG. 5B, the payload data blocks #1 to #8 having contiguous addresses are written into the main memory 350 in sequence. Moreover, the DIF data 1 to 8 corresponding to the payload data blocks #1 to #8 are stored into the DIF write cache 4451.

According to the present embodiment, the capacity of the DIF write cache 4451 of the DIF cache 445 may be 64 bytes, which may only be suitable for storing 8 DIF data. Therefore, when no room remains for storing the following DIF data, as shown in FIG. 5C, the PCI interface 440 may issue the 9th memory write request #9 in order to write all the DIF data 1 to 8 originally stored in the DIF write cache 4451 into the main memory 350.

According to the present embodiment, the maximum size of the memory access to the main memory 350 may be 512 bytes, therefore the DIF data 1 to 8 stored in the DIF write cache 4451 may be written into the main memory 350 through one memory write operation.

In contrast to the conventional technology which requires 16 memory write requests to be issued to the main memory 350, the present embodiment of the present invention only needs 9 memory write requests to accomplish the writing of the DIF data 1 to 8 corresponding to the payload data blocks 1 to 8 into the main memory 350, which largely decreases the times required for issuing the memory write requests to the main memory 350, and thus improves the overall system performance.

Figure 6:
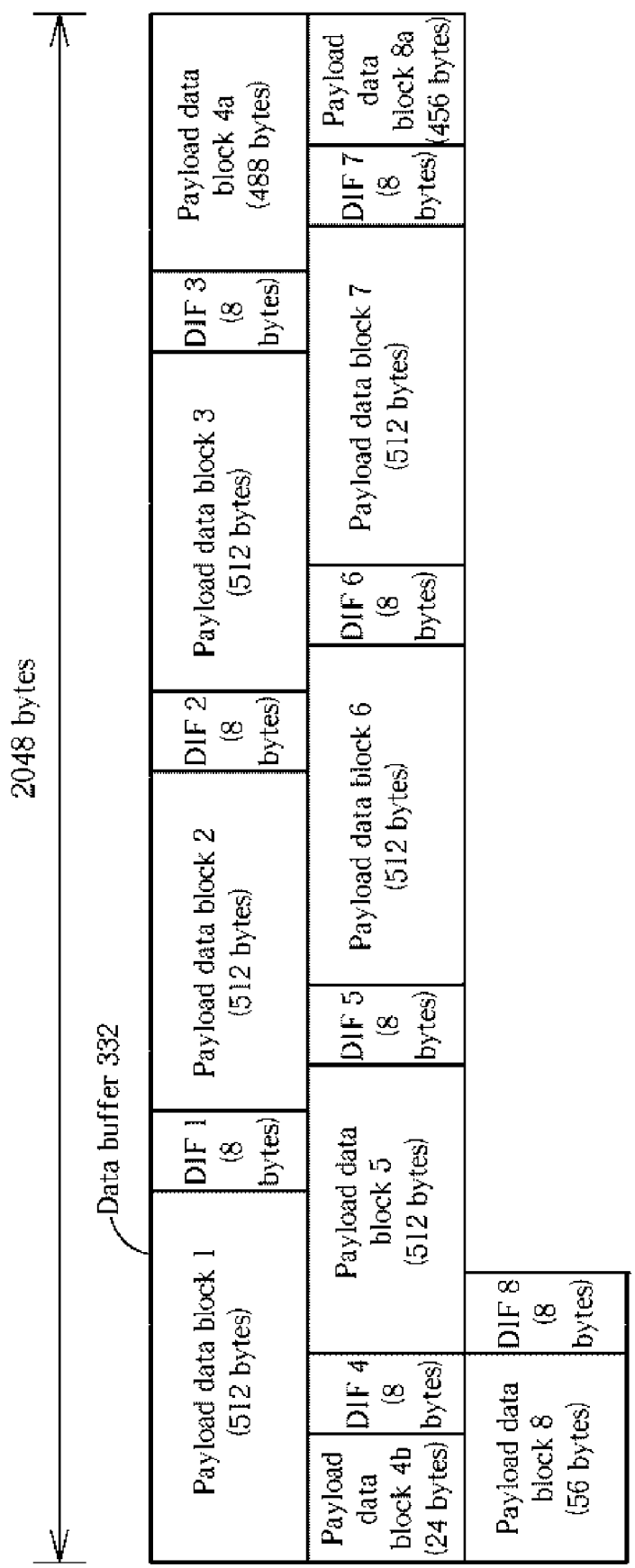
FIG. 6 illustrates data content of a host-side data buffer.

Another feature of the present embodiment of the present invention is the capability to merge the payload data blocks so as to further reduce the times required for issuing the memory write requests to the main memory 350. Please refer to FIG. 3. If the host-side IO controller 330 receives the data stream comprising 8 payload data blocks and the corresponding 8 DIF data from the host 310, the host-side IO controller 330 first stores the received data stream in an internal data buffer 332, e.g. a 2048-byte data buffer. As shown in FIG. 6, the data stream stored in the data buffer 332 may be transmitted through PCI protocol to the PCI interface 440 in the chipset 342 for further processing.

According to the aforementioned embodiment, the capacity of the data buffer 332, for example, may be 2048 bytes, therefore, as shown in FIG. 6, the payload data block 4 may be divided into two parts—a data block 4a (capacity is 488 bytes) and a data block 4b (capacity is 24 bytes), and the payload data block 8 may also be divided into two parts—a data block 8a (capacity is 456 bytes) and a data block 8b (capacity is 56 bytes).

Next, the PCI interface 440 receives the data stream stored in a data buffer 332 of the host-side IO controller 330 in sequence as illustrated in FIG. 6. The PCI interface 440 issues memory write requests to the main memory 350 in the aforementioned processes to write the payload data blocks 1 to 3 into the main memory 350, and to store the corresponding DIF data 1 to 3 into the DIF write cache 4451.

Because the addresses of the data block 4a (488 bytes) and the data block 4b (24 bytes) are contiguous, and the size of the data block 4a is not larger than the maximum size of the memory access to the main memory 350 (512 bytes), although the PCI interface 440 receives the data block 4a and the data block 4b respectively, the PCI interface 440 according to the present embodiment can combine these two data blocks into one complete payload data block 4 having a size of 512 bytes, and then issues the memory write request to the main memory 350.

Therefore, according to the content of the data buffer 332 as shown in FIG. 6, the PCI interface 440 only needs 9 memory write operations (8 memory write operations of the payload data blocks 1-8, and one memory write operation of the combined DIF data 1-8) to complete the writing of the data stored in the data buffer 332 into the main memory 350 with utilization of the DIF cache 445 and the function of merging the payload data blocks.

In contrast, with the conventional technology utilizing the DIF protection but without the DIF cache 445, each separate block in FIG. 6 (payload data blocks 1-3, 4a, 4b, 5-7, 8a, 8b, DIF data 1-8) requires a memory write request to the main memory 350, hence there are 18 memory write requests issued to the main memory 350 in total, as shown in FIG. 9.

Table 1 in FIG. 9 illustrates times of the memory write requests need to be issued to the main memory under different conditions, according to the content in FIG. 6. When the maximum size of the memory access to the main memory is 512 bytes, according to the conventional technology utilizing the DIF protection but without the DIF cache, 18 memory write requests need to be issued to the main memory; according to an embodiment of the present invention, with the utilization of the DIF cache but without the function of merging the payload data blocks, 11 memory write requests need to be issued to the main memory; according to another embodiment of the present invention, with the utilization of the DIF cache and with the function of merging the payload data blocks, only 9 memory write requests need to be issued to the main memory. When the maximum size of the memory access to the main memory is 256 bytes, according to the conventional technology utilizing the DIF protection but without the DIF cache, 26 memory write requests need to be issued to the main memory; according to an embodiment of the present invention, with the utilization of the DIF cache but without the function of merging the payload data blocks, 19 memory write requests need to be issued to the main memory; according to another embodiment of the present invention, with the utilization of the DIF cache and with the function of merging the payload data blocks, only 17 memory write requests need to be issued to the main memory. When the maximum size of the memory access to the main memory is 1024 bytes, according to the conventional technology utilizing the DIF protection but without the DIF cache, 18 memory write requests need to be issued to the main memory; according to an embodiment of the present invention, with the utilization of the DIF cache but without the function of merging the payload data blocks, 11 memory write requests need to be issued to the main memory; according to another embodiment of the present invention, with the utilization of the DIF cache and with the function of merging the payload data blocks, only 5 memory write requests need to be issued to the main memory. When the maximum size of the memory access to the main memory is 2048 bytes, according to the conventional technology utilizing the DIF protection but without the DIF cache, 18 memory write requests need to be issued to the main memory; according to an embodiment of the present invention, with the utilization of the DIF cache but without the function of merging the payload data blocks, 11 memory write requests need to be issued to the main memory; according to another embodiment of the present invention, with the utilization of the DIF cache and with the function of merging the payload data blocks, only 3 memory write requests need to be issued to the main memory.

Table 1 in FIG. 9 shows that the present invention is capable of writing a payload data block having DIF data into memory without dramatically increasing the number of memory write requests to the main memory. Obviously, compared with the conventional DIF technology, the storage controller having the DIF cache and the function of merging the payload data blocks according to an embodiment of the present invention can effectively decrease the memory write requests to the main memory.

The above-mentioned embodiment illustrates the functions of the data buffer 332 of the host-side IO controller 330, and moreover, the device-side IO controller 360 of the embodiment also includes a data buffer 362 which has a similar function of data buffering.

As mentioned above, in the illustrated embodiments of the present invention, the DIF cache 445 in FIG. 4 may include the DIF write cache 4451 (shown in FIGS. 5A, 5B, and 5C) and the DIF read cache 4452 (shown in FIGS. 7A and 7B) for storing the DIF data intended to be written to the main memory 350 and read out from the main memory 350, respectively. According to one embodiment of the present invention, the DIF data command buffer 455 of the first DIF IO interface 460 and the DIF data command buffer 457 of the second DIF IO interface 470 both contain a DIF write data command buffer internally for storing commands for writing a DIF data (not shown in the figures). According to one embodiment of the present invention, the DIF data command buffer 455 of the first DIF IO interface 460 and the DIF data command buffer 457 of the second DIF IO interface 470 both contain a DIF read data command buffer 570 internally for storing commands for reading a DIF data (not shown in the figures).

Figure 7A:
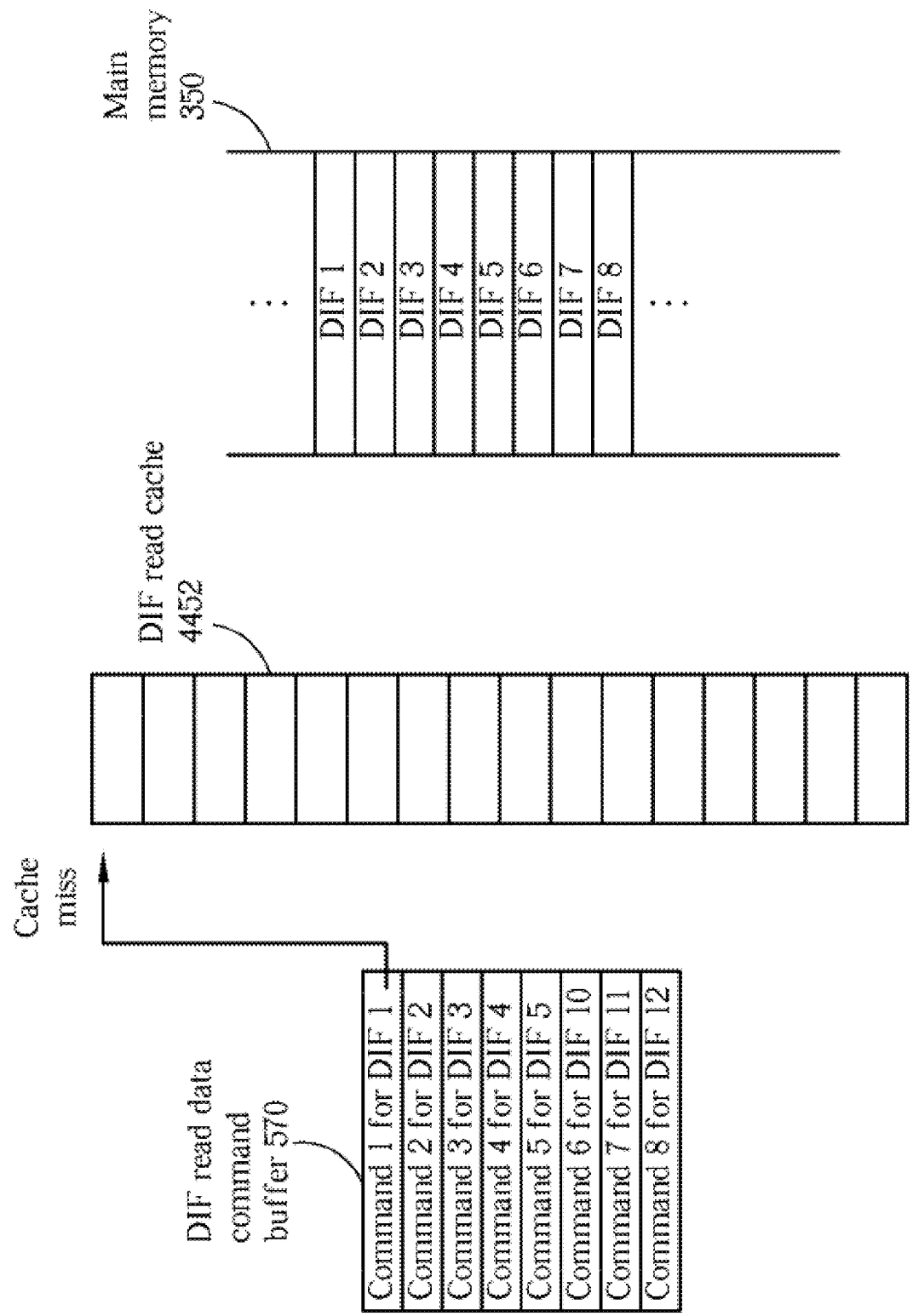
FIGS. 7A, 7B and 7C illustrate the processing of DIF data reading out from a main memory.

Please refer to FIG. 7A, which illustrates the DIF read cache 4452 of the DIF cache 445 in FIG. 4 and the DIF read data command buffer 570. The DIF read cache 4452 is for storing the DIF data read out from the main memory 350, and the DIF read data command buffer 570 is for storing the commands for reading a DIF data.

As shown in FIG. 7A, a command 1 in the DIF read data command buffer 570 is a command for reading out the DIF data 1. First, the command 1 may search to determine whether the DIF data 1 exists in the DIF read cache 4452 or not. If the DIF data 1 which is requested by the command 1 does not exist in the DIF read cache 4452, a cache miss occurs and a memory read request needs to be issued to the main memory 350 to load the DIF data 1 into the DIF read cache 4452 from the main memory 350.

Figure 7B:
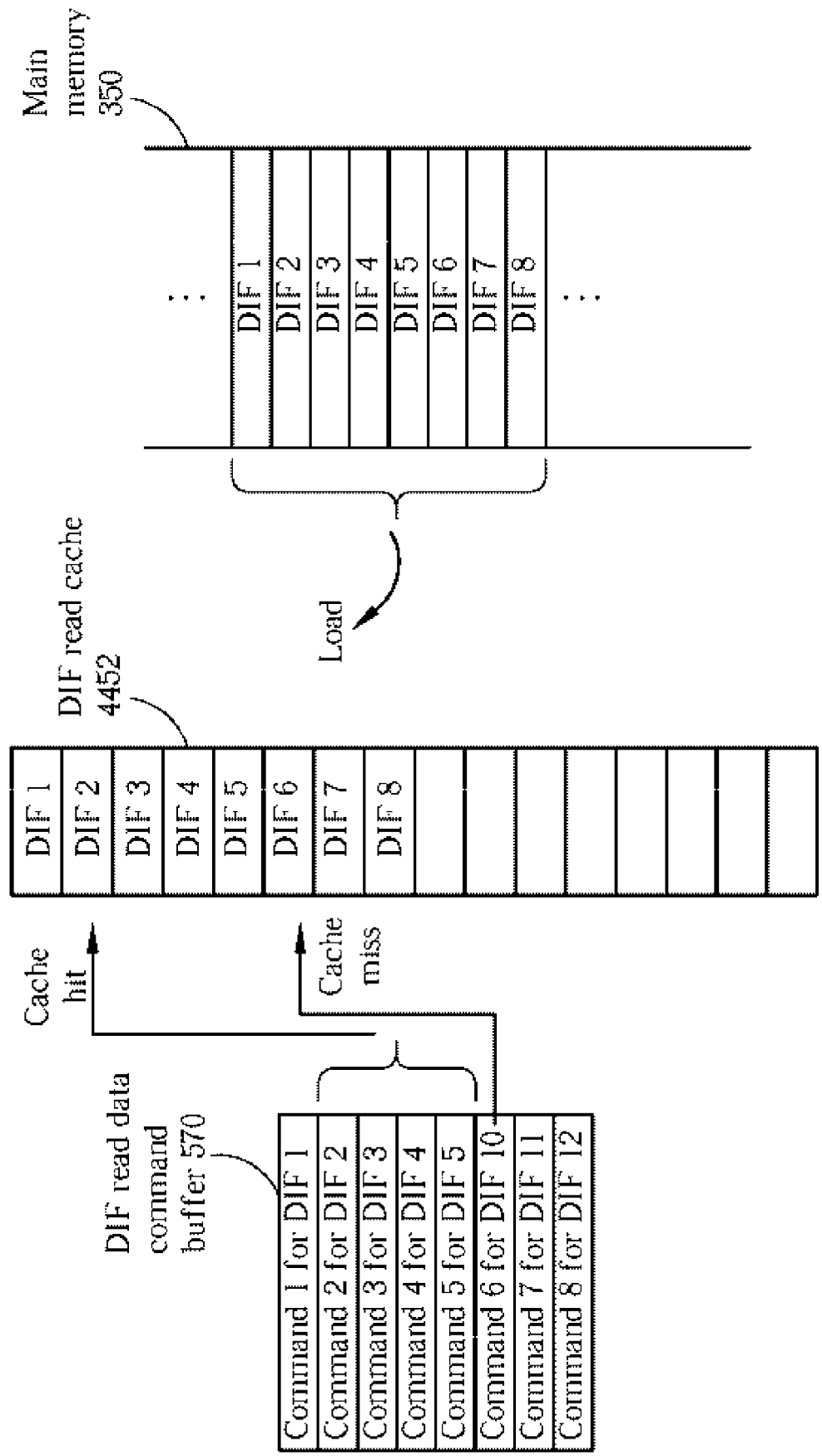

As mentioned above, in the present embodiment, the maximum size of the memory access to the main memory 350 may be 512 bytes, and the size of the DIF data may be 8 bytes. Therefore, as shown in FIG. 7B, the DIF data 1 to 8 having contiguous addresses may be read out from the main memory 350 through one memory read operation, instead of only the DIF data 1 being read out. The DIF data 1 to 8 may be stored into the DIF read cache 4452. It should be noted that the aforementioned maximum size of the memory access is an example for illustrative purposes only, and is not meant to be a limitation of the present invention.

As mentioned above and shown in FIG. 7B, the DIF data 1 to 8 having contiguous addresses already have been read out and stored into the DIF read cache 4452 due to a cache miss of the command 1. As a result, the command 1 may find the DIF data 1 in the DIF read cache 4452, and the following commands 2 to 5 in the DIF read data command buffer 570 may obtain a cache hit result, finding the required DIF data 2 to 5 in the DIF read cache 4452, instead of executing a memory read operation to the main memory 350, respectively. However, due to lack of the DIF data 10 required by the command 6 in the DIF read data command buffer 570 according to FIG. 7B, a cache miss will occur.

Figure 7C:
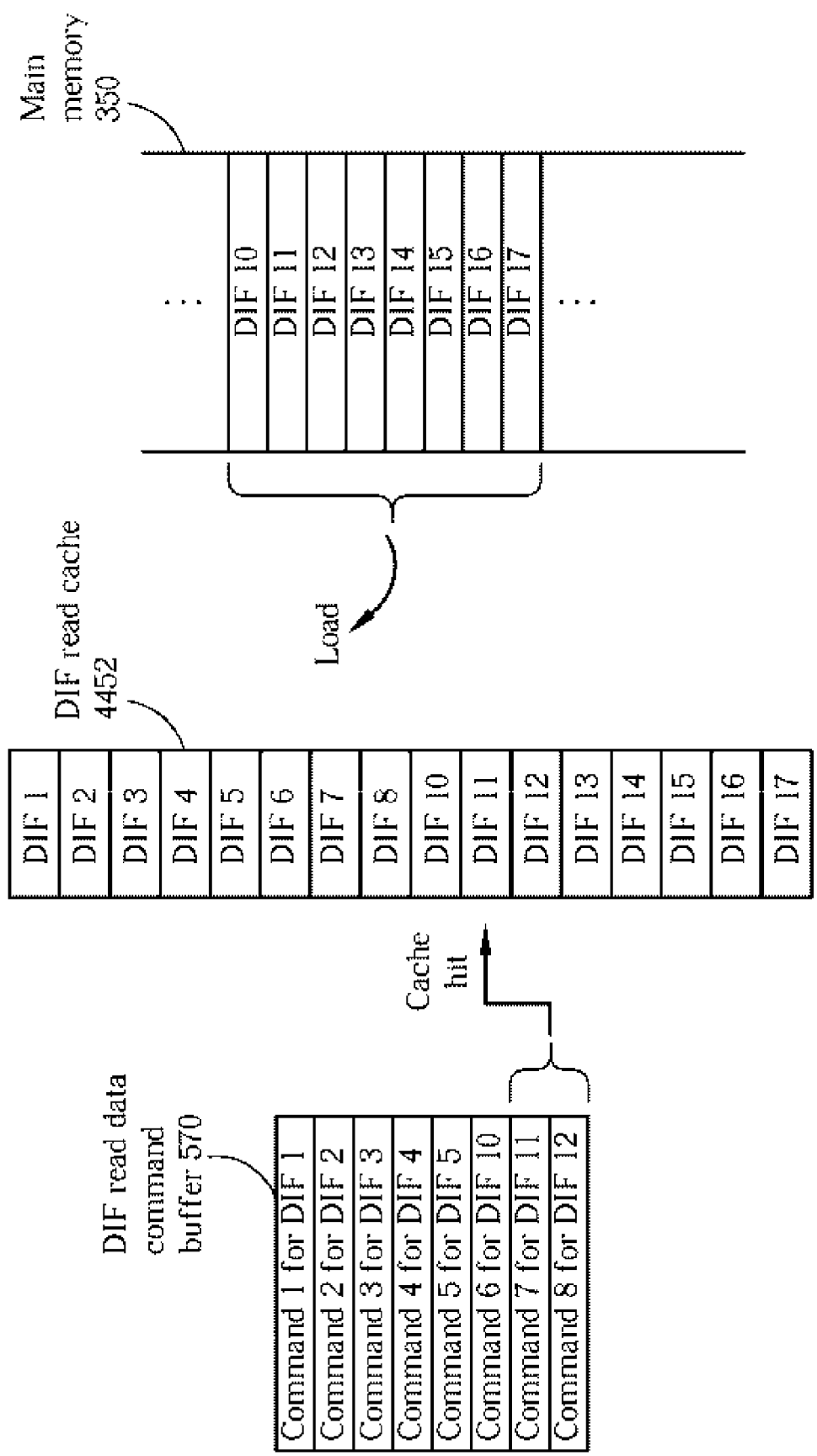

As shown in FIG. 7C, when the cache miss occurs due to lack of the DIF data 10 required by the command 6 in the DIF read data command buffer 570, as mentioned above, another memory read operation may be executed to read out the DIF data 10 to 17 having contiguous addresses, and to load the read out data into the DIF read cache 4452. Then, the DIF data 10 required by the command 6 may be read out.

Similarly, the DIF data 11 and 12 respectively corresponding to the commands 7 and 8, which follows command 6 in the DIF read data command buffer 570, have been read into the DIF read data command buffer 570 due to the cache miss of the command 6, and thus may result in a cache hit and be found in the DIF read cache 4452 directly without the need to execute respective memory read operations to the main memory 350. Hence, the memory accesses to the main memory may be reduced effectively to improve the performance of the entire system.

Figure 8:
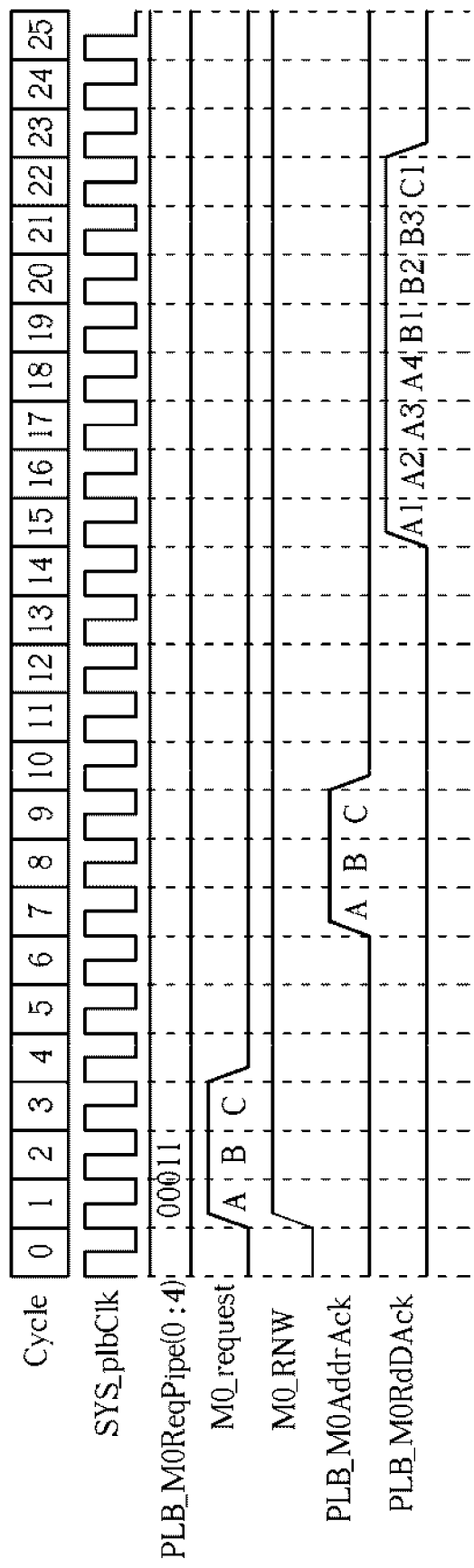
FIG. 8 is a clock diagram of part of buses of a processor according to the present invention.

FIG. 8 is a clock diagram of a processor local bus (PLB) for illustrating the operations of the commands and data on the PM bus 450 according to the embodiment of the present invention. For example, the PCI-E interface is a PLB protocol.

As shown in FIG. 8, with M0_request, commands ABC are issued to request a data sequence (A1A2A3A4B1B2B3C1) during cycles 1 to 3. Then, with PLB_M0AddrAck, a receiving acknowledgement is replied during cycles 7 to 9. In FIG. 8, the data sequence (A1A2A3A4B1B2B3C1) may be retrieved with PLB_M0RdDAck during cycles 15 to 22. In other words, after the issuing of the command ABC is completed since the 3rd cycle, 19 cycles must be waited, that is, until the 22nd cycle, before the receiving of the desired data may be completed. This means that execution of the data read command may be accomplished only after a long period of time. However, before receiving the desired data, the PLB bus is capable of knowing the address of the desired data in advance. As shown in FIG. 8, although PLB_M0RdDAck actually finishes receiving the data sequence (A1A2A3A4B1B2B3C1) during the cycles 15 to 22, the PLB bus may compare the memory address of the data sequence (A1A2A3A4B1B2B3C1) in advance to confirm that the request for the data sequence (A1A2A3A4B1B2B3C1) has already been issued to the memory.

Hence, according to the above feature of the PLB bus, in an embodiment of the present invention, the read process of the aforementioned DIF data may be designed as follows: when the command 1 in the DIF read data command buffer 570, as shown in FIG. 7A, issues a memory read request to the main memory 350 due to the cache miss which occurred in the read cache 4452, whether cache misses will occur in the commands 2 to 8 or not can be determined before the DIF data 1 to 8 are loaded into the DIF read cache 4452.

Therefore, the cache hits of the commands 2 to 5 and the cache miss of the command 6 can be determined without waiting for completion of the loading of the DIF data 1 to 8 into the DIF read cache 4452. After determining that a cache miss will occur in the command 6, a memory read command may be issued to read the DIF data 10 to 17 to the memory, instead of waiting for completion of the loading of the DIF data 1 to 8 into the DIF read cache 4452. According to the present embodiment, before a memory read command can read a corresponding DIF data back, the cache miss of the next memory read command can be determined and then the next memory read command can be issued in advance. Through the steps mentioned, the system wait time may be saved, and processing efficiency may be increased effectively.

On the contrary, if the above design is not utilized, the determination of a cache miss or a cache hit can be performed only after the cache data has been read and stored in the DIF read cache 4452. Therefore, for the command 6 stored in the DIF read data command buffer 570, the determination of the cache miss can be performed only after the DIF data has been read back, and then another memory read command may be issued only after the cache miss is determined, and another period of time must be waited for before receiving the DIF data 10 to 17 and storing the received data into the DIF read cache 4452. As a result, the system performance is reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A storage controller for processing a data stream, the storage controller comprising:
    a host-side IO controller for receiving a data stream from a host;
    a device-side IO controller for connecting to a physical storage device (PSD);
    a central processing circuitry for connecting the host-side IO controller and the device-side IO controller, the central processing circuitry having at least one data integrity field (DIF) IO interface for processing DIF data corresponding to payload data blocks in the received data stream; and
    a main memory connected to the central processing circuitry for storing data processed by the central processing circuitry,
wherein the at least one DIF IO interface comprises a DIF cache for temporarily storing DIF data in order to reduce access times to the main memory.

2. The storage controller of claim 1, wherein the DIF IO interface is capable of verifying the payload data blocks and the corresponding DIF data in the received data stream to determine the data integrity of the payload data blocks.

3. The storage controller of claim 1, wherein the DIF IO interface further comprises a primary memory First-in First-out buffer (PM FIFO buffer) and a bus interface, and the bus interface is for receiving the data stream and for transferring the payload data blocks and the corresponding DIF data in the data stream into the PM FIFO buffer and the DIF cache respectively.

4. The storage controller of claim 3, wherein, while receiving the data stream, the bus interface first merges the payload data blocks having contiguous addresses, and then writes the merged payload data blocks into the main memory.

5. The storage controller of claim 3, wherein while the bus interface receives the data stream, DIF data corresponding to a plurality of the payload data blocks having contiguous addresses are stored in the DIF cache and then transferred into the main memory by one memory write request.

6. The storage controller of claim 3, wherein the bus interface is a peripheral component interconnect interface (PCI), a peripheral component interconnect extended interface (PCI-X), or a peripheral component interconnect express interface (PCI-E).

7. The storage controller of claim 1, wherein the DIF cache comprises a DIF write cache for storing DIF data to be written to the main memory, and a DIF read cache for storing DIF data read out from the main memory.

8. The storage controller of claim 1, wherein the DIF cache comprises a DIF write cache for storing DIF data to be written to the main memory.

9. The storage controller of claim 8, wherein, while receiving the data stream, the bus interface first merges the payload data blocks having contiguous addresses, and then writes the merged payload data blocks to the PM FIFO buffer.

10. The storage controller of claim 8, wherein when the DIF data to be stored in the DIF write cache and a previous DIF data stored in the DIF write cache do not have contiguous addresses, all data stored in the DIF write cache are stored into the main memory before the DIF data to be stored in the DIF write cache are stored into the DIF write cache.

11. The storage controller of claim 8, wherein storing all the data stored in the DIF write cache into the main memory is activated through a software command.

12. The storage controller of claim 8, wherein when the DIF write cache is full, all the data in the DIF write cache are stored into the main memory.

13. The storage controller of claim 1, wherein the DIF cache comprises a DIF read cache for storing DIF data read out from the main memory.

14. The storage controller of claim 13, wherein if the DIF data to be read out is not stored in the DIF read cache, a plurality of the DIF data having contiguous addresses from the address of the DIF data to be read out in the main memory are read into the DIF read cache by one memory read request.

15. The storage controller of claim 13, wherein the DIF IO interface comprises a DIF read data command buffer for storing read commands of the DIF data to be read out, the DIF read data command buffer contains a first read command and a second read command therein, the second read command is sent to the DIF read data command buffer later than the first read command and is executed later than the first read command, and before the second read command is executed, a potentially occurred cache miss can be determined and a read command is then issued to the main memory for reading the DIF data to be read out into the DIF read cache in advance.

16. The storage controller of claim 1, wherein the DIF IO interface further comprises a PM FIFO buffer and a bus interface, the bus interface is for receiving the data stream and for transferring the payload data blocks and the corresponding DIF data in the data stream to the PM FIFO buffer and the DIF cache respectively, and the DIF cache comprises a DIF write cache for storing DIF data to be written to the main memory, and a DIF read cache for storing DIF data read out from the main memory.

17. A data integrity field (DIF) IO interface for processing a data stream having DIF data, the DIF IO interface comprising:

a bus interface for receiving a data stream containing a plurality of payload data blocks, wherein each of the payload data blocks has a corresponding DIF data in the data stream;

a DIF cache connected to the bus interface for storing the DIF data in the data stream temporarily; and a primary memory (PM) FIFO buffer connected to the bus interface for storing the payload data blocks in the data stream, wherein the bus interface is capable of determining the payload data blocks and the DIF data in the data stream and storing the payload data blocks and the DIF data in the data stream into the PM FIFO buffer and the DIF cache respectively.

18. The DIF IO interface of claim 17, wherein the bus interface is capable of verifying each of the payload data blocks and the corresponding DIF data in the received data to determine the data integrity of each of the payload data blocks.

19. The DIF IO interface of claim 17, wherein, while receiving the data stream, the bus interface first merges the payload data blocks having contiguous addresses, and then writes the merged payload data blocks into the main memory.

20. The DIF IO interface of claim 17, wherein while the bus interface receives the data stream, DIF data corresponding to a plurality of the payload data blocks having contiguous addresses are stored in the DIF cache and then transferred to the main memory by one memory write request.

21. The DIF IO interface of claim 17, wherein the bus interface is a PCI interface, a PCI-X interface, or a PCI-E interface.

22. The DIF IO interface of claim 17, wherein the DIF cache comprises a DIF write cache for storing DIF data to be written into the main memory, and a DIF read cache for storing DIF data read out from the main memory.

23. The DIF IO interface of claim 17, wherein the DIF cache comprises a DIF write cache for storing DIF data to be written into the main memory.

24. The DIF IO interface of claim 23, wherein, while receiving the data stream, the bus interface first merges the payload data blocks having contiguous addresses, and then stores the merged payload data blocks into the PM FIFO buffer.

25. The DIF IO interface of claim 23, wherein when the DIF data to be stored into the DIF write cache and a previous DIF data stored in the DIF write cache do not have contiguous addresses, all the data stored in the DIF write cache are stored into the main memory before the DIF data to be stored in the DIF write cache are stored into the DIF write cache.

26. The DIF IO interface of claim 23, wherein storing all the data stored in the DIF write cache into the main memory is activated through a software command.

27. The DIF IO interface of claim 23, wherein when the DIF write cache is full, all the data in the DIF write cache are stored into the main memory.

28. The DIF IO interface of claim 17, wherein the DIF cache comprises a DIF read cache for storing DIF data read out from the main memory.

29. The DIF IO interface of claim 28, wherein if the DIF data to be read out is not stored in the DIF read cache, a plurality of the DIF data having contiguous addresses from the address of the DIF data to be read out in the main memory are read into the DIF read cache by one memory read request.

30. The DIF IO interface of claim 28, wherein the DIF IO interface comprises a DIF read data command buffer for storing read commands of the DIF data to be read out, the DIF read data command buffer contains a first read command and a second read command therein, the second read command is sent to the DIF read data command buffer later than the first read command and is executed later than the first read command, and before the second read command is executed, a potentially occurred cache miss can be determined and a read command is then issued to the main memory for reading the DIF data to be read out into the DIF read cache in advance.

31. A method for processing a data stream in a storage controller comprising the following steps:

receiving a data stream containing a plurality of payload data blocks, wherein each of the payload data blocks has a corresponding data integrity field (DIF) data in the data stream;

retrieving and temporarily storing the DIF data in the data stream into a DIF cache in the storage controller; and writing the data temporarily stored in the DIF cache into a main memory of the storage controller in order to reduce access times to the main memory.

32. The method of claim 31, wherein after the step of receiving the data stream, the method further comprises a step of: verifying the each of the payload data blocks and the corresponding DIF data in the received data to determine the data integrity of each of the payload data blocks.

33. The method of claim 31, wherein the payload data block in the data stream is stored into a primary memory (PM) FIFO buffer of the storage controller, and while receiving the data stream, the payload data blocks having contiguous addresses are merged first, and then the merged payload data blocks are written into the main memory.

34. The method of claim 31, wherein the DIF cache comprises a DIF write cache and a DIF read cache, and the method further comprises a step of: storing DIF data to be written to the main memory into the DIF write cache, and storing DIF data read out from the main memory into the DIF read cache.

35. The method of claim 31, wherein the DIF cache comprises a DIF write cache, and the method further comprises a step of: storing DIF data to be written to the main memory into the DIF write cache.

36. The method of claim 35, wherein the payload data block in data stream is stored in a PM FIFO buffer of the storage controller, and while receiving the data stream, the payload data blocks having contiguous addresses are merged first, and then the merged payload data blocks are stored into the PM FIFO buffer.

37. The method of claim 35, wherein when the DIF data to be stored in the DIF write cache and a previous DIF data stored in the DIF write cache do not have contiguous addresses, all the data stored in the DIF write cache are stored into the main memory before the DIF data to be stored in the DIF write cache are stored into the DIF write cache.

38. The method of claim 35, wherein storing all the data stored in the DIF write cache into the main memory is activated through a software command.

39. The method of claim 35, wherein when the DIF write cache is full, all the data in the DIF write cache are stored into the main memory.

40. The method of claim 31, wherein the DIF cache comprises a DIF read cache, and the method further comprises a step of: storing DIF data read out from the main memory into the DIF read cache.

41. The method of claim 40, wherein if the DIF data to be read out is not stored in the DIF read cache, a plurality of the DIF data having contiguous addresses from the address of the DIF data to be read out in the main memory are read into the DIF read cache by one memory read request.

42. The method of claim 40, wherein the DIF IO interface comprises a DIF read data command buffer for storing read commands of the DIF data to be read out, the DIF read data command buffer contains a first read command and a second read command therein, the second read command is sent to the DIF read data command buffer later than the first read command and is executed later than the first read command, and before the second read command is executed, a potentially occurred cache miss can be determined and a read command is then issued to the main memory for reading the DIF data to be read out into the DIF read cache in advance.

* * * * *